United States Patent [19]

Dinh

[11] Patent Number: 5,343,632
[45] Date of Patent: Sep. 6, 1994

[54] CLOSED-LOOP DRYING PROCESS AND SYSTEM

[75] Inventor: Khanh Dinh, Gainesville, Fla.

[73] Assignee: Advanced Dryer Systems, Inc., Gainesville, Fla.

[21] Appl. No.: 866,416

[22] Filed: Apr. 10, 1992

[51] Int. Cl.$^5$ ............................................. F26B 3/00
[52] U.S. Cl. ........................................ 34/507; 34/77; 34/86
[58] Field of Search .................. 34/73, 74, 76, 77, 78, 34/26, 32, 35, 86, 218, 219, 220, 223, 224, 225

[56] References Cited

U.S. PATENT DOCUMENTS

| | | | |
|---|---|---|---|
| 4,987,688 | 1/1991 | Petit et al. | 34/77 |
| 5,119,571 | 6/1992 | Beasley | 34/77 |
| 5,152,077 | 10/1992 | Liang | 34/219 |

*Primary Examiner*—Henry A. Bennett
*Attorney, Agent, or Firm*—Foley & Lardner

[57] ABSTRACT

A dryer is designed as a closed system in which heated air used to dry the materials is continuously recycled within the drying compartment of the dryer without being discharged to the atmosphere, thus increasing the efficiency of the system while preventing the discharge of contaminated vapors to the atmosphere and also conserving energy which would otherwise be required to heat or air-condition the air drawn into the dryer from the building in which the dryer is located. A regenerative heat exchanger and an atmospheric cooler/condenser are provided in the dryer and condense and remove moisture from the saturated air and transfer the heat of condensation back into the air before the air is reheated and recycled back to the materials to be dried. The drying compartment may comprise an enclosed tunnel through which a rack of superposed trays are conveyed or may comprise some other conveying mechanism.

28 Claims, 6 Drawing Sheets

CLOSED-LOOP DRYING PROCESS AND SYSTEM

BACKGROUND OF THE INVENTION

The present invention relates to a system and process for drying materials and more particularly relates to a drying system which uses a heated drying medium such as air to dry materials.

Figure 1:
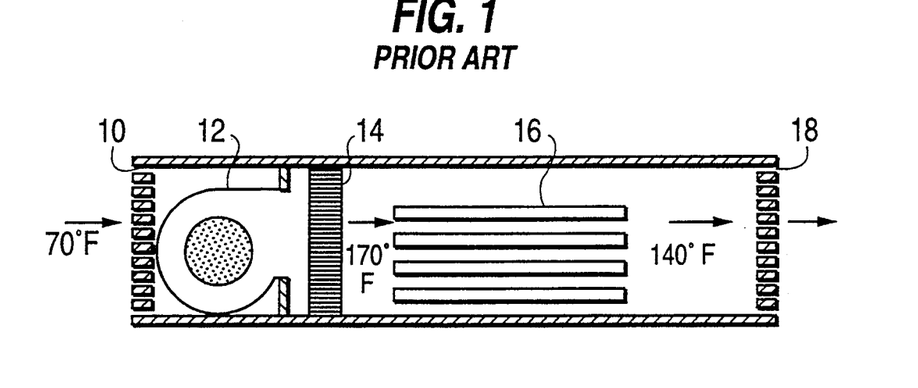
FIG. 1 schematically illustrates a first conventional drying system.

In a wide variety of industries, large amounts of materials must be dried before use or before undergoing further treatment such as incineration. These industries include, but are not limited to, the lumber industry, many food processing industries, the paper production industry, the waste treatment industry, and the fertilizer production industry. In such industries, the materials are typically dried by forcing relatively hot air over the materials to evaporate the moisture from the materials. With reference to FIG. 1, ambient air is drawn into an inlet 10 of a conventional system via a blower 12, which then forces the air over a heater 14 which heats the air to a temperature of, e.g., 170° F. The heated air then travels over a plurality of superposed drying trays 16 which convey the material to be dried through the system in a direction which is usually opposite to the direction of flow of the air. After evaporating the moisture from the material, the heated and saturated air is discarded directly to the atmosphere via an outlet 18 of the system.

While this system adequately dries the materials, it is extremely inefficient since all of the energy used to heat the air is lost when the saturated air is discharged from the outlet of the dryer. In fact, in a typical industrial system in which ambient air at 70° F. is heated to 170° F. for drying, 1,000,000 BTU/hr must be consumed to dry the materials to the required moisture levels. In addition, the heated air also serves as a source of heat pollution when it is discharged into the atmosphere.

Figure 2:
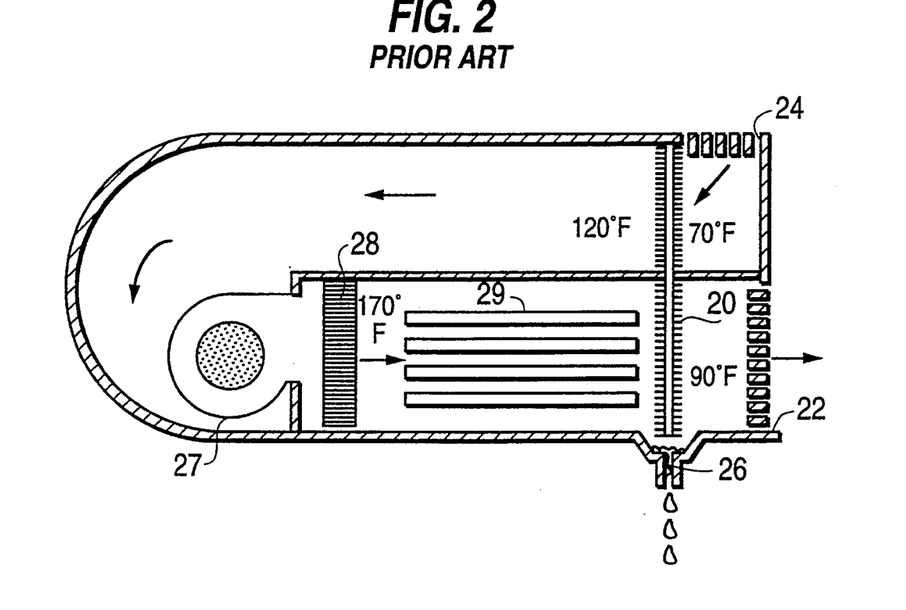
FIG. 2 schematically illustrates a second conventional drying system.

In order to increase the efficiencies of dryers, other types of dryers have been proposed which use a heat-exchanger which recoups some of the heat which would otherwise be lost when the air is discharged. Referring to FIG. 2, these systems typically employ a dryer having a regenerative heat exchanger 20 thermally connecting the inlet of the dryer to the outlet. Heat exchanger 20 removes some of the heat from the saturated air before the air is discharged from the dryer from an outlet 22, and transfers the extracted heat to air entering the dryer from an inlet 24. During this process, some of the moisture condenses out of the saturated air and is removed from the system via a drain 26. Meanwhile, the air which has been heated by the heat exchanger is drawn through a blower 27, is heated further by a heater 28, and then dries the material present in trays 29, thereby becoming saturated. The saturated air is then forced through heat exchanger 20 and subsequently discharged from the dryer in the manner discussed above.

This system is more efficient than earlier systems since at least some of the heat which would otherwise be wasted through the discharge of the saturated air is recouped. In the typical system in which air is drawn into the dryer at 70° F. the air is heated to about 120° F. by heat exchanger 20 so that only about 500,000 BTU/hr need be consumed by heater 30 to raise the temperature of the air to the desired temperature of 170° F.

Despite the increased efficiencies, systems which recoup some of the wasted heat in this manner still exhibit several disadvantages.

First, the system is still relatively inefficient since the heat exchanger 20 is incapable of removing all of the heat from the discarded air or of transferring it to the incoming air. In fact, in the latter part of the drying stage when there is little evaporation and the air entering the heat exchanger 20 is thus no longer saturated, most of the heat added to the system is used to heat the air rather than to evaporate moisture and is thus discarded with the air.

Another disadvantage results from discharging the drying air out of the dryer. Many materials, such as sludge, hospital wastes, and refuse transfer particles to the air in the drying process which, at best, produce an unpleasant odor and, at worst, are contagious or toxic to the environment. In the types of systems discussed above, the air being discharged from the dryer must undergo a complicated and expensive scrubbing operation before being released to the atmosphere. However, even these operations often do not guarantee that all odoriferous, toxic, or contagious particles will be removed from the air before the air is discharged to the atmosphere.

Heated air is also used to dry clothes in industrial and residential clothes dryers. In the typical clothes dryer 30, illustrated in FIG. 3, a drum 34 is rotatably mounted in a housing 32 and is driven to rotate by a motor 36. A blower 38 draws air into an inlet 40 of housing 32 which typically opens into the interior of the building. The air is then heated from an ambient temperature of, e.g., 80° F. to a suitable drying temperature of, e.g., 200° F. by a heating element 42. The thus heated air is subsequently forced through the drum 34 in contact with the clothes 44 to be dried, where it receives moisture from the clothes and is cooled to a temperature of, e.g., 160° F. The air is then drawn through a lint filter 46 before being discharged from an outlet 48 of housing 32. In order to avoid unnecessarily humidifying the air in the building, the outlet 48 typically connects to the exterior of the building. The heating element of the average residential dryer will expend about 5 to 6 Kw of energy during the drying process.

Figure 3:
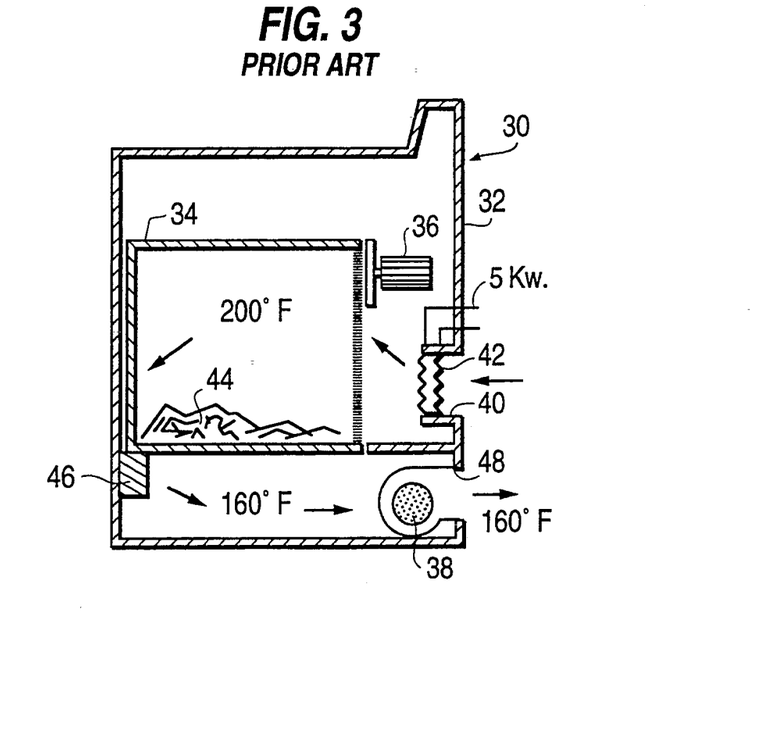
FIG. 3 schematically illustrates a conventional clothes dryer.

Even when the system described above operates at maximum efficiency at the beginning of a drying cycle when the clothes are relatively wet, only about 50% of the heat added to the air by heating element 48 is used to vaporize the water, while the remaining 50% is wasted when the moisture-laden air is discharged to the atmosphere. At the end of the drying cycle when the clothes are relatively dry, as little as 10% of the energy added to the air is actually used to vaporize water, while the remaining 90% is wasted. Thus, by failing to recirculate the air, the conventional dryer wastes a large percentage of the heat used to dry the clothes in the dryer. Moreover, since the air used for drying is drawn from the inside of the building and is thus often heated or air conditioned before being drawn into the dryer, the energy used to condition the air within the building is wasted when the air is discharged from the dryer to the exterior of the building. Additional energy must be expended to heat or air-condition the air lost from the building in the drying process.

SUMMARY OF THE INVENTION

It is therefore an object of the invention to provide a system for drying materials which is more efficient than previously known systems.

Another object of the invention is to provide a system for drying materials which is relatively inexpensive and which eliminates the danger of releasing odoriferous or harmful particles to the atmosphere.

In accordance with a first aspect of the invention, a dryer includes an enclosed housing having a drying compartment located therein for receiving materials to be dried, a heating element located in the housing, and means for recirculating a drying medium in a closed-loop manner from the heating element, through the drying compartment, and then back to the heating element.

In order to increase further the efficiency of the dryer, a regenerative heat exchanger may be placed in the housing between the drying compartment and the heating element. The regenerative heat exchanger may have a first portion which cools and dehumidifies the drying medium and a second portion which reheats the drying medium. A cooler/condenser may be provided between the first and second portions of the regenerative heat exchanger to further cool and dehumidify the drying medium. The first portion of the regenerative heat exchanger preferably comprises an evaporator portion of a first heat pipe heat exchanger, and the second portion of the regenerative heat exchanger comprises a condenser portion of the first heat pipe heat exchanger. The cooler/condenser preferably comprises an evaporator portion of a second heat pipe heat exchanger having a condenser portion located outside of the housing.

Still another object of the invention is to provide a clothes dryer which is more efficient than previously known clothes dryers and which does not waste the energy used to heat or air condition the air present in the building in which the dryer is located.

In accordance with this aspect of the invention, the drying compartment comprises a rotatable drum which receives the materials to be dried. The housing is preferably divided into first and second compartments which are interconnected by an inlet and an outlet. The rotatable drum is located in the first compartment, and the regenerative heat exchanger and the cooler/condenser are located in the second compartment.

Another object of the invention is to provide a method of drying materials which is more efficient than previously known methods.

Still another object of the invention is to provide a method of drying materials in which the danger of discharging harmful particles to the atmosphere is eliminated with minimal expense.

Pursuant to these objects of the invention, a method of drying materials comprises a first step of inserting the materials in a drying compartment of an enclosed housing, a second step of heating a drying medium via a heating device, a third step of conveying the drying medium through the drying compartment in contact with the materials, and a fourth step of conveying the drying medium back to the heating element without venting the drying medium out of the housing. The second through fourth steps are repeated to form a closed-loop drying cycle in which the drying medium is continuously recirculated through the dryer without being discharged to the atmosphere.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENTS

Pursuant to the present invention, a dryer is designed as a closed system in which a heated drying medium such as air is used to dry the materials and is continuously recycled within the drying compartment of the dryer without being discharged to the atmosphere, thus increasing the efficiency of the system while preventing the discharge of contaminated vapors to the atmosphere and conserving energy which would otherwise be required to heat or air condition the air drawn into the dryer from a building. In order to increase further the efficiency of the system, a regenerative heat exchanger and an atmospheric cooler/condenser are provided which condense and remove moisture from saturated air and which transfer the heat of condensation back into the air before the air is reheated by a make-up heater and recycled back to the material to be dried. The drying compartment may comprise an enclosed tunnel through which a rack of superposed trays are conveyed or may comprise a rotatable drum, or any other conveying mechanism.

Figure 4:
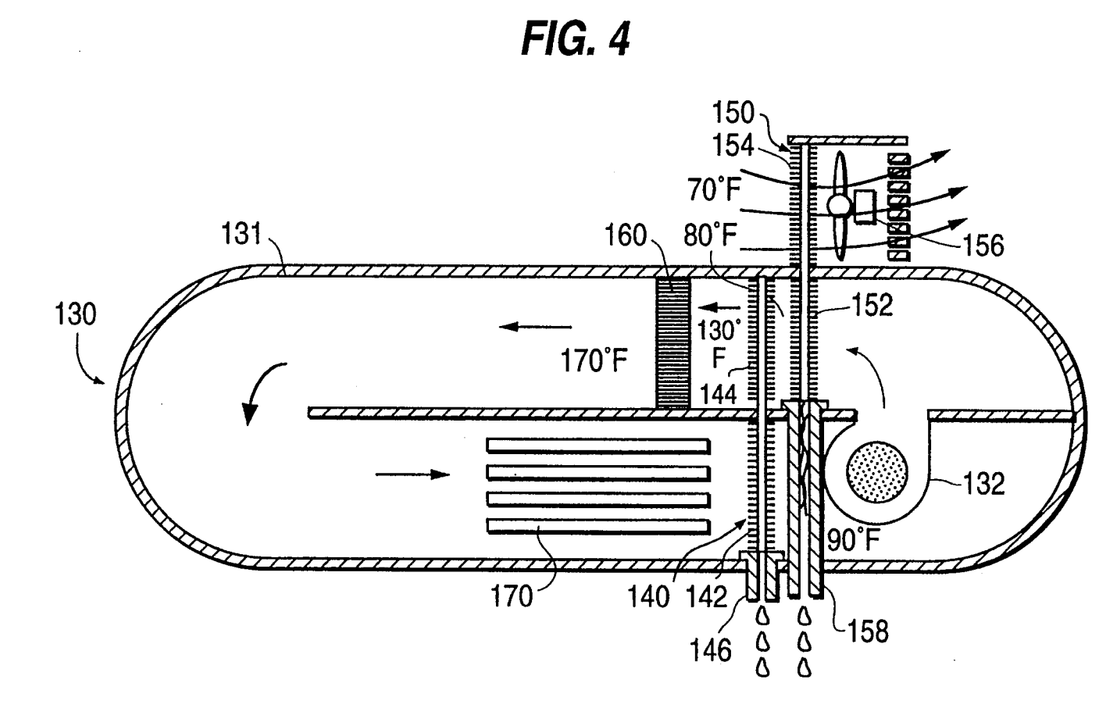
FIG. 4 schematically illustrates a drying system constructed in accordance with a preferred embodiment of the invention.

Referring to FIG. 4, a commercial or industrial dryer 130 includes a blower 132 which is mounted in an enclosed housing 131 and which forces a drying medium through the dryer in a closed-loop airstream in the direction of the arrows. Although air is typically used as the drying medium, some applications may dictate the use of other drying media such as carbon dioxide which do not permit combustion of the materials being dried, even if drying takes place at extremely high temperatures. The dryer further includes a first heat exchanger 140 functioning as a regenerative heat exchanger, a second heat exchanger 150 functioning as an atmospheric cooler/condenser, a make-up heater 160, and a plurality of trays 170 which transport the materials to be dried through a closed tunnel forming the drying compartment of the dryer. A more detailed description of the preferred structure and operation of each of these elements follows.

Each of the heat exchangers is designed to exchange heat between the air flowing through the portion of the dryer and a medium located in another portion of the dryer or exterior of the dryer. Although a wide variety of heat exchangers could be used for this purpose, the preferred heat exchanger is a so-called "heat pipe heat exchanger" which exchanges both sensible and latent heat. The structure and operation of such a heat exchanger is well known and is often referred to simply as a "heat pipe". A heat pipe heat exchanger typically comprises a condenser portion and an evaporator portion connected to one another to form a closed-loop system. The condenser and evaporator portions may comprise separate coils connected by conduits, or may comprise a single pipe in which refrigerant in the lower, evaporator portion of the pipe vaporizes and rises through the center of the pipe to the upper, condenser portion of the pipe where it condenses on the sides of the pipe and drains back down into the evaporator portion. Air flowing through the heat pipe heat exchanger is cooled and dehumidified by the evaporator portion and is subsequently reheated to some extent by the condenser. The construction and operation of both types of heat pipe heat exchanger are well-known per se, and are described in more detail in U.S. Pat. No. 4,607,498, which issued to Khanh Dinh on May 25, 1984, and U.S. Pat. No. 4,827,733, which issued to Khanh Dinh on Oct. 20, 1987, both of which are incorporated herein by reference.

In the preferred embodiment, the heat pipe heat exchanger forming the regenerative heat exchanger 140 includes an evaporator portion 142 located downstream of the drying trays 170 and a condenser portion 144 which is located between the cooler/condenser 150 and the make-up heater 160. A drain 146 is provided to remove moisture condensed from the air. If the heat pipe heat exchanger is one having separate evaporator and condenser coils, the condenser need not be positioned directly on top of the evaporator portion as illustrated, but only need be located at least partially above the evaporator portion so that condensed refrigerant may flow from the condenser portion to the evaporator portion. Moreover, the evaporator portion could even be located above the condenser portion if a pump is provided to pump condensed refrigerant from the condenser portion to the evaporator portion.

The heat pipe heat exchanger forming the cooler/condenser 150 includes an evaporator portion 152 which is located between the blower 132 and the condenser portion 144 of the regenerative heat exchanger 140 and a condenser 154 which is located outside of the housing. If desired, a fan 156 may be provided to facilitate heat transfer between the condenser portion 154 and the ambient air. Although the condenser portion 154 is illustrated as being positioned directly above the evaporator, the condenser portion could be located at any convenient location outside of the dryer 130.

The superposed trays 170 are positioned on a conventional conveyor which conveys the material to be dried through the dryer in a direction opposite to that of the flow of the air in the dryer. The length of conveyance and the speed of the conveyor can be calculated in a known manner so that the materials reach the end of the conveyor at the desired moisture level. The material to be dried can be fed to the trays through a closable opening (not shown) in the housing of dryer or, if the conveyor extends all the way through the dryer in a sealed manner, can be placed on the trays before the trays are conveyed into the dryer.

The operation of the system will now be described with reference to FIG. 4.

Material to be dried is placed on the trays 170 and is conveyed to the left as viewed in FIG. 4 through a distance sufficient to dry the materials in contact with air which has been initially heated to a temperature of, e.g., 170° F. by make-up heater 160.

After absorbing moisture from the materials in the drying chamber of the dryer, the heated and moistened air flows through the evaporator portion 142 of the regenerative heat exchanger 140 where part of the heat is removed from the saturated air. The amount of heat removed will vary from about 30% to about 70% of its total heat, depending on the ratio of sensible to latent heat of the air. In the typical operation in which about 50% of the heat is removed, the air is cooled to a temperature of about 90° F. with some of the moisture in the air being condensed. The condensed water is removed from the dryer via drain 146.

After leaving the evaporator portion 142, the still-humid air is drawn through blower 132 and is then forced through the evaporator portion 152 of the cooler/condenser 150, where further moisture is removed through condensation and is removed from the dryer 130 via a drain 158. The heat absorbed from the air by the evaporator portion 152 of the cooler/condenser 150 is transferred to the ambient atmosphere via condenser portion 154. In practice, air typically is cooled from about 90° to 80° F. in the evaporator portion. By condensing liquids out of the regenerative heat exchanger and the cooler/condenser at different temperatures, the system is capable of ensuring the condensation and removal of different chemicals at different points in the system.

The dehumidified air is then forced through the condenser portion 144 of regenerative heat exchanger 140, where it absorbs heat removed by the evaporator portion 142 and is reheated. In a typical operation, air is heated from 80° F. to 130° F. via contact with condenser portion 144. This air is then heated to the desired temperature of, e.g. 170° F. by the make-up heater 160. The heated air is then recirculated into the section of the dryer where it contacts the materials to be dried, and the process is repeated.

Since the temperature of the air exiting the condenser portion 144 of the regenerative heat exchanger is considerably higher than that entering conventional systems, considerably less energy needs to be consumed to raise the temperature of the air to the desired drying levels. In fact, the make-up heater of the disclosed embodiment only needs to consume about 400,000 BTU/hr to heat the air to the required levels in a typical industrial drying system. In addition, since the air in the dryer is never discharged to the atmosphere, the dangers of releasing toxic or odoriferous pollutants are eliminated.

Although condenser portion 154 cooperates with the atmosphere in the illustrated embodiment, this condenser portion could exchange heat with any cooling medium having a temperature lower than that of the air contacting the evaporator portion 152.

Figure 8:
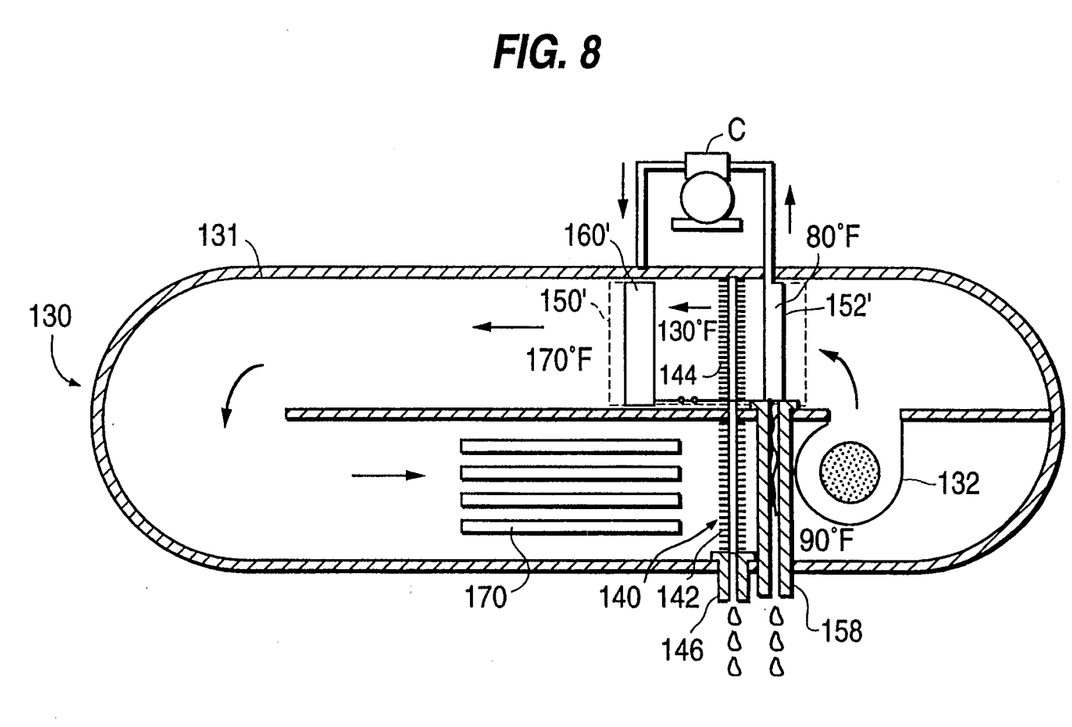
FIG. 8 schematically illustrates a drying system constructed in accordance with the embodiment of the invention illustrated in FIG. 4 but in which the cooler/condenser is replaced by a conventional vapor compression heat pump.

Moreover, as schematically illustrated in FIG. 8, the cooler/condenser of the system illustrated in FIG. 4 can be replaced by a conventional vapor compression heat pump 150' whose evaporator 152' can act as the cooler/condenser and whose condenser 160' can act as the heater for the system. As is typical with vapor compression heat pumps, refrigerant is compressed in a compressor C, condensed in condenser 160', evaporated in evaporator 152', and recirculated to compressor C in a closed loop.

Figure 5:
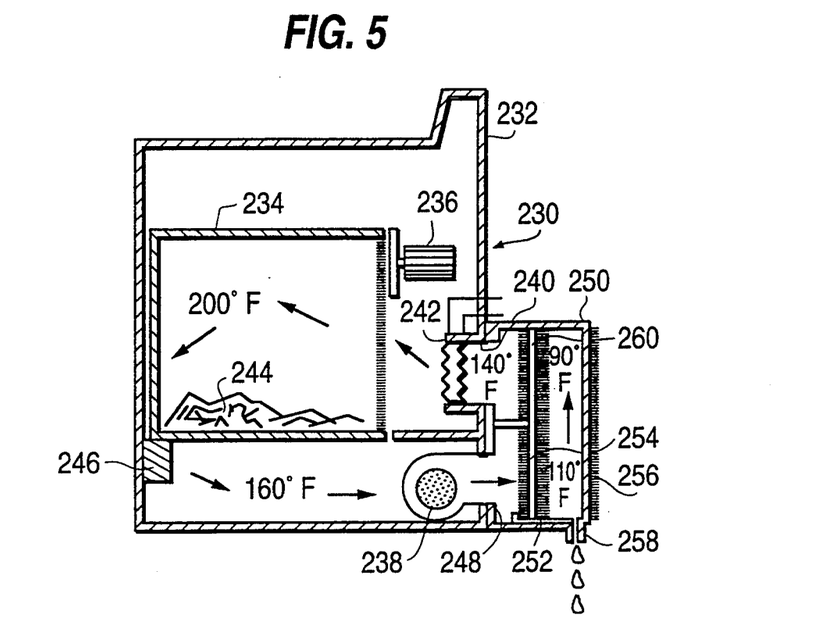
FIG. 5 schematically illustrates a clothes dryer constructed in accordance with a preferred embodiment of the invention.

Referring to FIG. 5, heat pipe heat exchangers can also be placed in a clothes dryer 230 to provide a closed-loop clothes dryer. The dryer 230 includes an enclosed housing separated into first and second compartments 234 and 250 connected by an inlet 240 and an outlet 248. A rotatable drum 234, which is driven by a motor 236 and which receives clothes 244 to be dried, is located in the first compartment 232, along with a make up-heater 242, a lint filter 246, and a blower 238. A regenerative heat exchanger 252 is provided in the second compartment 250, along with an atmospheric cooler/condenser 256 and a drain 258 for condensed liquid.

The regenerative heat exchanger 252 preferably comprises a heat pipe heat exchanger having an evaporator portion 254 and a condenser portion 260. The cooler/condenser 256 may be formed by any cooling element, but preferably comprises an evaporator portion of a heat pipe heat exchanger which has a condenser portion (not shown) cooperating with the exterior of the dryer. The condenser portion of the heat pipe heat exchanger may be located in either the interior or the exterior of the building in which the dryer 230 is located.

In operation, relatively warm and dry air having a temperature of, e.g., 140° F., is drawn into the inlet 240 of first compartment 232 by blower 238 and is heated to a preferred drying temperature of, e.g., 200° F. by make-up heater 242. The heated air is then drawn through the rotating drum 234 of the dryer, where it is cooled while absorbing moisture from the clothes 244 located therein. After being filtered in lint filter 246, the warm, moist air is drawn through the blower 238, out of the outlet 248 of the first compartment 232, and through the evaporator portion 254 of the regenerative heat exchanger 252, where part of the heat is removed from the saturated air. The amount of heat removed will vary depending on the ratio of sensible to latent heat of the air. In the typical operation, the air is cooled to a temperature of about 110° F., with some of the moisture in the air being condensed and removed from the dryer via drain 258.

After leaving the evaporator portion 254 of regenerative heat exchanger 252, the still-humid air flows past cooler/condenser 256, where further moisture is condensed and is removed via drain 258. The heat absorbed from the air by cooler/condenser 260 is transferred either to the interior or the exterior of the building in which the dryer is located. In practice, air typically is cooled from about 110° to 90° F. in the cooler/condenser 256.

The dehumidified air is then forced through the condenser portion 260 of regenerative heat exchanger 252, where it absorbs heat removed by the evaporator portion 254. In a typical operation, air is heated from 90° F. to 140° F. via contact with condenser portion 260. This air is then heated to the desired temperature of 200° F. by make-up heater 242, and the process is repeated.

The system described above can be retrofitted into any existing residential dryer, or could be incorporated into new dryers. In addition, the system could be easily modified to operate during the drying cycle of a dishwasher.

Since the disclosed clothes dryer recycles the air used for drying and regenerates at least a portion of the heat added to the air, the energy requirements of the dryer are considerably reduced. In fact, in a typical residential dryer having 5 Kw to 6 Kw heating element, the heating element can be reduced to about 2 Kw. This alone will result in an energy savings of about 625 Kwh/year in typical use of a residential dryer. Moreover, since no air is vented from the dryer in the disclosed system, no heated or air conditioned air is lost from the building in which the dryer is located. This is of no small import since it is estimated that the conventional dryer vents out about 200 cubic feet of air per minute during a drying cycle, and since an average of about 1.5 Kwh of energy is needed to either heat or air condition the air used for drying in the winter and summer months. The clothes dryer described above would thus conserve an additional 200 Kwh/year in typical operation.

Figure 6:
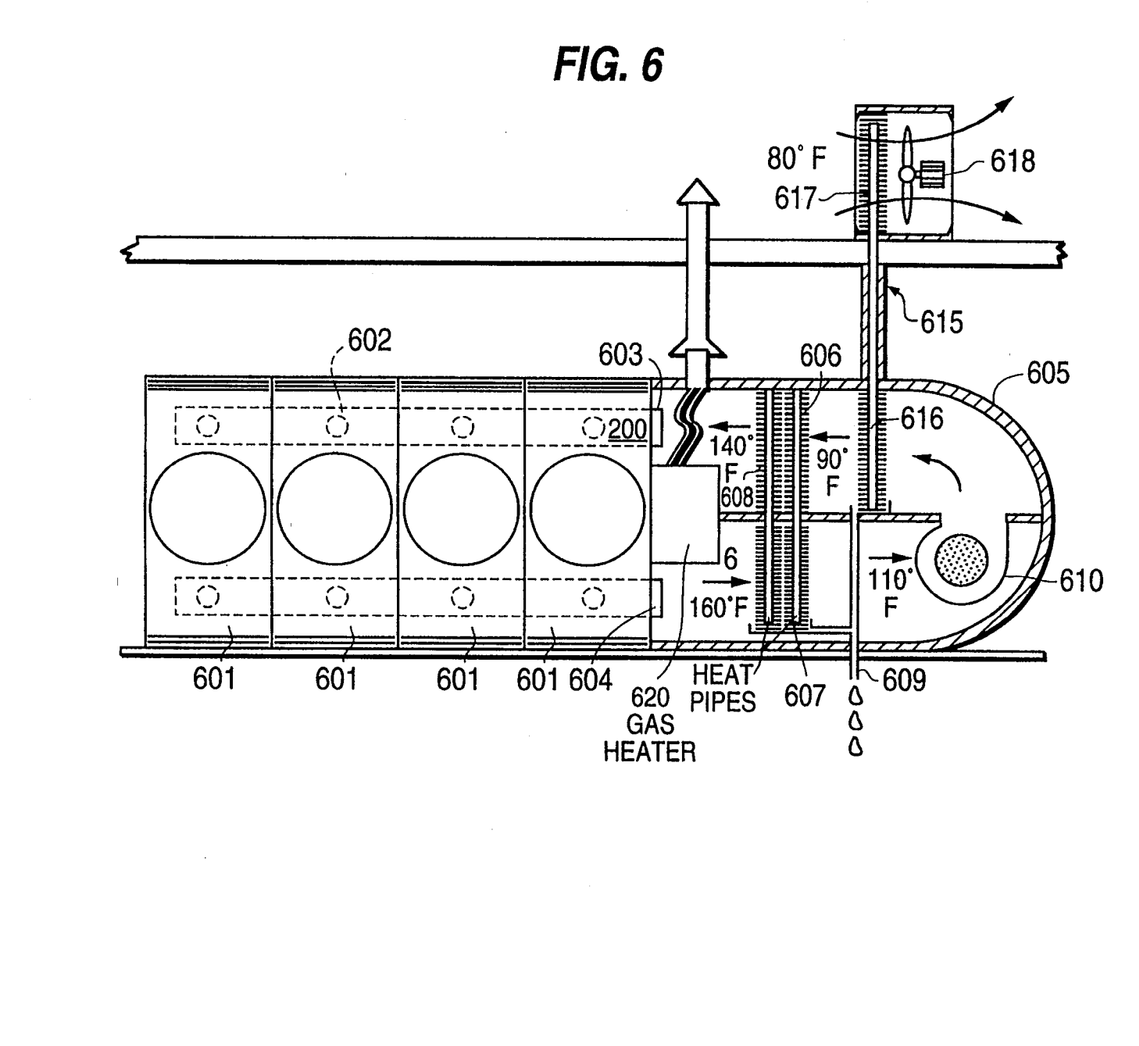
FIG. 6 schematically illustrates a commercial laundromat dryer system constructed in accordance with a preferred embodiment of the invention.

A manifolded version of the invention could be used in commercial laundromats. Referring to FIG. 6, commercial laundromat dryers 601 will have their air inlets and outlets manifolded to form one closed chamber 602 with an inlet 603 and an outlet 604. An apparatus 605 is constructed with a blower 610 inside which draws the drying medium through outlet 604 and which recirculates the drying medium to the chamber 602 through inlet 603. The drying medium will pass through the evaporator section 607 of a regenerative heat-pipe heat exchanger system 606 where it will be cooled. The condensate formed will drain out through drain 609. Then, the drying medium will be circulated through the cooler condenser 616 of another heat pipe heat-exchanger system 615 having its condensing section 617 located outside the dryer and cooled by a fan 618 or any other cooling means. The condensing section of the cooler condenser 616 will cool down further the drying medium and form more condensate to drain out through drain 609. The cooled drying medium will then pass through condenser 608 where it is reheated, and then will be further reheated to the drying temperature by a conventional heater such as gas heater 620. It then is recirculated back to chamber 602 for another drying cycle. Not shown are the control device which admits the drying medium only to the drums in use and lint filters which remove the lint from the drying medium before the drying medium is recirculated through evaporator 607.

Figure 7:
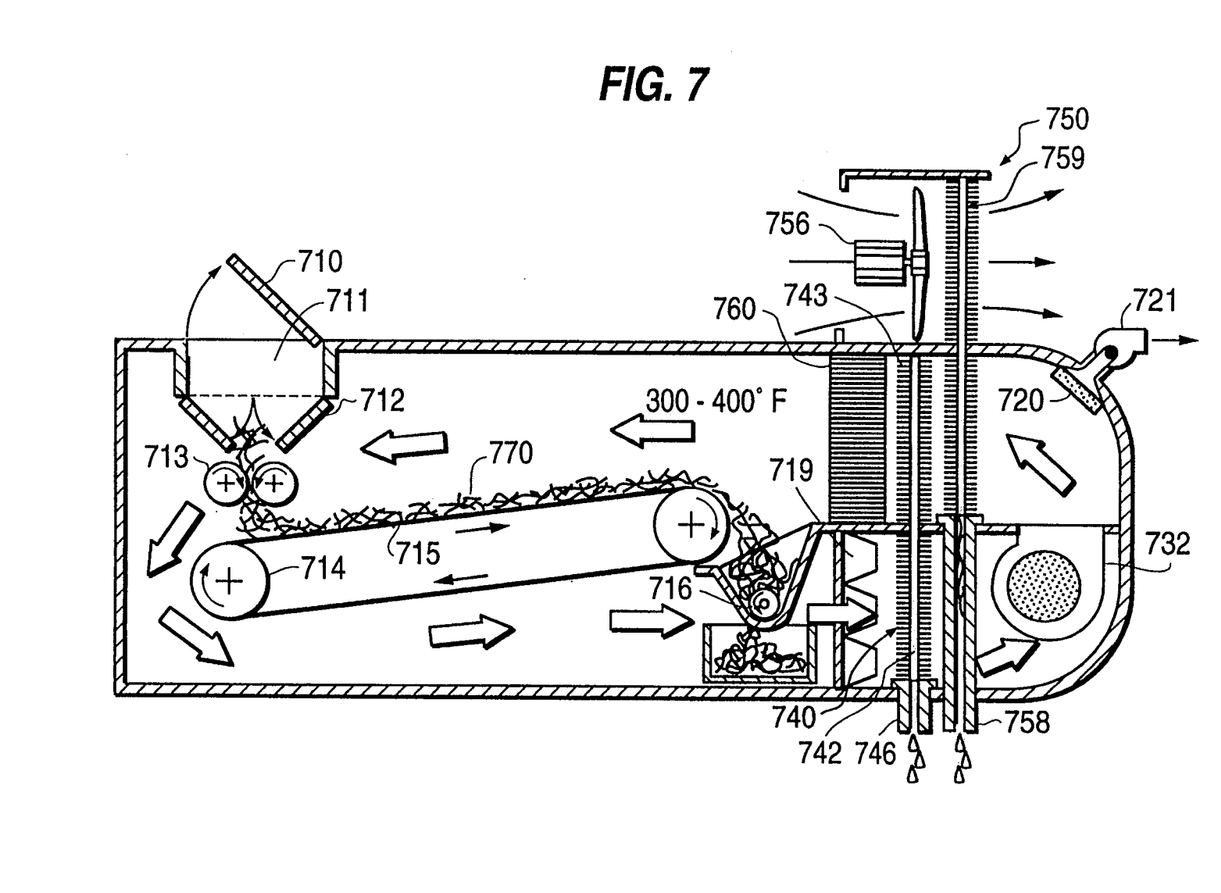
FIG. 7 schematically illustrates a hospital hazardous wastes disposal and sanitation system using a preferred embodiment of the invention.

Referring to FIG. 7, a contagious hospital wastes disposal system is illustrated using the same principle of the system in FIG. 4. An air-tight hopper 711 with a lid 710 which opens to allow loading of wastes has trap doors 712 which open to allow wastes to fall on a shredder 713 which reduces the wastes to small pieces 770. Usually, the lid and the trap doors open sequentially to insure air-tightness. A conveyor belt 715, powered by roller 714, carries the shredded wastes or roasters in a direction which is counter to the flow of hot stream from heater coil 760. The heat from steam dries out and disinfects the roasters. The disinfected roasters 717 then fall into auger 716 which discharges the roasters into container 718 for disposal. The humidity-laden air moves through filter bags 719 and then through the evaporator end 742 of regenerator heat-pipe 740 on which some moisture will condense and drain out via a condensate drain 746. The air then is drawn through blower 732 and the evaporator section 752 of heat pipe heat exchanger 750, where more moisture is condensed and drained out of the system via condensate drain 758. The heat removed from the air by evaporator section 752 is transferred to the condenser section 753 of a heat pipe 750 which is cooled by atmospheric air powered by a fan 756. The air is then drawn through the condensing section 743 of regenerator heat-pipe 740 where it is preheated, and then is heated further by heater 760 to recommence the cycle.

To prevent leakage of contaminated air from the system to the outside of the unit in an uncontrolled manner, a small blower 721 is used to aspirate a small amount of this air through a filter 720 to maintain the system under negative pressure. The condensate discharged from the condensate drains and air discharges by the small blower may require further treatments not covered by the scope of this invention.

Although the regenerative heat exchangers and the cooler/condensers are each illustrated as a single heat pipe heat exchanger in each of the systems described above, it is to be understood that each element could, in practice, be formed of a plurality of heat pipe heat exchangers which are located side-by-side and which are connected by common fins. Moreover, although the make-up heaters of the preferred embodiments comprise heating coils such as a steam coil or an electric heating element, any device capable of raising the temperature of the recirculated air up to the temperature desired for drying could be used as the make-up heaters. In addition, the blowers need not be located in the illustrated positions, but could be positioned in any location where they draw air through the respective dryer in a closed loop. Moreover, the system may include by-pass dampers or ports to allow variable volumes of air to bypass the regenerative heat-exchanger and/or the cooler-condenser to improve air speed over the products to be dried. Extra blowers or fans can also be used for such purposes. The disclosed heat-pipe heat exchangers could be replaced with air-water heat exchangers or with any heat exchangers capable of performing the described functions, including heat-exchangers with desiccants such as heat-wheels.

What is claimed is:

1. A dryer comprising:
   (A) an enclosed housing having a drying compartment located therein for receiving materials to be dried in contact with a drying medium;
   (B) a heating element located in said housing which heats said drying medium;
   (C) means for dehumidifying said drying medium which includes a regenerative heat exchanger which is self-regenerative and which is located in said housing between said drying compartment and said heating element; and
   (D) means for recirculating said drying medium within said enclosed housing in a closed-loop manner from said heating element, through said drying compartment and said means for dehumidifying, and then back to said heating element without venting said drying medium outside of said enclosed housing.

2. The dryer of claim 1, wherein said regenerative heat exchanger has a first portion which cools and dehumidifies said drying medium and a second portion which reheats said drying medium, and wherein said means for dehumidifying further comprises a cooler/condenser located between said first and second portions of said regenerative heat exchanger and which further cools and dehumidifies said drying medium.

3. A dryer comprising:
   (A) an enclosed housing having a drying compartment located therein for receiving materials to be dried in contact with a drying medium;
   (B) a heating element located in said housing;
   (C) means for dehumidifying said drying medium said means for dehumidifying including a regenerative heat exchanger located in said housing between said drying compartment and said heating element; and
   (D) means for recirculating said drying medium in a closed-loop manner from said heating element, through said drying compartment and said means for dehumidifying, and then back to said heating element;
   wherein said regenerative heat exchanger has a first portion which cools and dehumidifies said drying medium and a second portion which reheats said drying medium, and wherein said means for dehumidifying further comprises a cooler/condenser located between said first and second portions of said regenerative heat exchanger and which further cools and dehumidifies said drying medium;
   wherein
   said first portion of said regenerative heat exchanger comprises an evaporator portion of a first heat pipe heat exchanger,
   said second portion of said regenerative heat exchanger comprises a condenser portion of said first heat pipe heat exchanger, and
   said cooler/condenser comprises an evaporator portion of a second heat pipe heat exchanger.

4. The dryer of claim 3, wherein said second heat pipe heat exchanger further comprises a condenser portion located outside of said housing.

5. The dryer of claim 4, further comprising a device which is located outside of said housing and which draws a cooling medium through said condenser portion of said second heat pipe heat exchanger.

6. The dryer of claim 2, wherein said drying compartment comprises a closed tunnel, and further comprising a tray which is positionable within said tunnel and which receives said materials to be dried.

7. The dryer of claim 2, wherein said drying compartment comprises a closed tunnel, and further comprising a plurality of superposed trays which are located in said drying compartment and which receive said materials to be dried.

8. The dryer of claim 2, wherein said drying compartment comprises a rotatable drum which receives said materials to be dried.

9. The dryer of claim 8, wherein said housing is divided into first and second compartments which are interconnected by an inlet and an outlet.

10. The dryer of claim 9, wherein said rotatable drum is located in said first compartment, and wherein said regenerative heat exchanger and said cooler/condenser are located in said second compartment.

11. The dryer of claim 2, wherein said means for recirculating comprises a blower.

12. The dryer of claim 1, wherein said drying medium comprises air.

13. The dryer of claim 1, wherein said drying medium comprises gasses other than air.

14. The dryer of claim 13, wherein said drying medium comprises carbon dioxide.

15. The dryer of claim 1, wherein said means for dehumidifying comprises an evaporator of a vapor compression heat pump.

16. The dryer of claim 1, wherein said heating element comprises a condenser of said vapor compression heat pump.

17. The dryer of claim 1, further comprising means for creating a negative pressure in said housing to avoid leakage of pollutants out of said housing.

18. A method of drying materials, said method comprising the steps of:
   (A) inserting said materials in a drying compartment of an enclosed housing;
   (B) heating a drying medium via a heating device; then
   (C) conveying said drying medium through said drying compartment in contact with said materials; then
   (D) dehumidifying said drying medium by conveying said drying medium through a regenerative heat exchanger located in said housing between said drying compartment and said heating element; then
   (E) conveying said drying medium back to said heating element without venting said drying medium out of said housing; and then
   (F) repeating said steps (B) through (E).

19. The method of claim 18, wherein said step of conveying said drying medium through said regenerative heat exchanger comprises the steps of conveying said drying medium through a first portion of said regenerative heat exchanger in which said drying medium is cooled by removing heat therefrom and is dehumidified, and then
   conveying said drying medium through a second portion of said regenerative heat exchanger in which said drying medium is reheated utilizing said removed heat, and wherein said step of dehumidifying said drying medium further comprises the step of conveying said drying medium through a cooler/condenser which is located between said first and second portions of said regenerative heat exchanger and in which said drying medium is further cooled and dehumidified.

20. The method of claim 19, wherein said steps of conveying said drying medium through said regenerative heat exchanger and said cooler/condenser each comprise the step of conveying said drying medium through a heat pipe heat exchanger in order to accomplish said reheating and said dehumidifying.

21. The method of claim 19, wherein said step of inserting said materials in said drying compartment comprises the steps of placing said materials on a tray which is located in a tunnel forming said drying compartment.

22. The method of claim 21, further comprising the step of conveying said tray through said tunnel in a direction which is opposite to the direction in which said drying medium flows through said tunnel.

23. The method of claim 19, wherein said step of inserting said materials in said drying compartment comprises the step of placing said materials in a rotatable drum.

24. A dryer as recited in claim 1, wherein said regenerative heat exchanger a non-compressor operated regenerative heat exchanger.

25. A method as recited in claim 18 wherein said during step (D) drying medium is conveyed through a non-compressor operated regenerative heat exchange.

26. A dryer as recited in claim 1, wherein said regenerative heat exchanger is a heat exchanger without moving parts.

27. A dryer as recited in claim 1, wherein said regenerative heat exchanger operates without requiring any external power.

28. A dryer comprising:
   (A) an enclosed housing having a drying compartment located therein for receiving materials to be dried in contact with a drying medium;
   (B) a heating element located in said housing which heats said drying medium;
   (C) a heat pipe heat exchanger having an evaporator which dehumidifies and removes heat from said drying medium and a condenser which heats said drying medium utilizing said removed heat;
   (D) means for recirculating said drying medium in a closed-loop manner so that it passes through said heating element, said drying compartment, and said heat pipe heat exchanger.

* * * * *